Dec. 15, 1936.　　　G. R. KILGORE　　　2,064,012
MAGNETO-STATIC OSCILLATOR
Filed July 1, 1932　　　7 Sheets-Sheet 1

WITNESSES:
C. J. Weller
Roy W. Bailey

INVENTOR
George R. Kilgore.
BY
F. W. Lyle.
ATTORNEY

Dec. 15, 1936.  G. R. KILGORE  2,064,012
MAGNETO-STATIC OSCILLATOR
Filed July 1, 1932  7 Sheets-Sheet 2
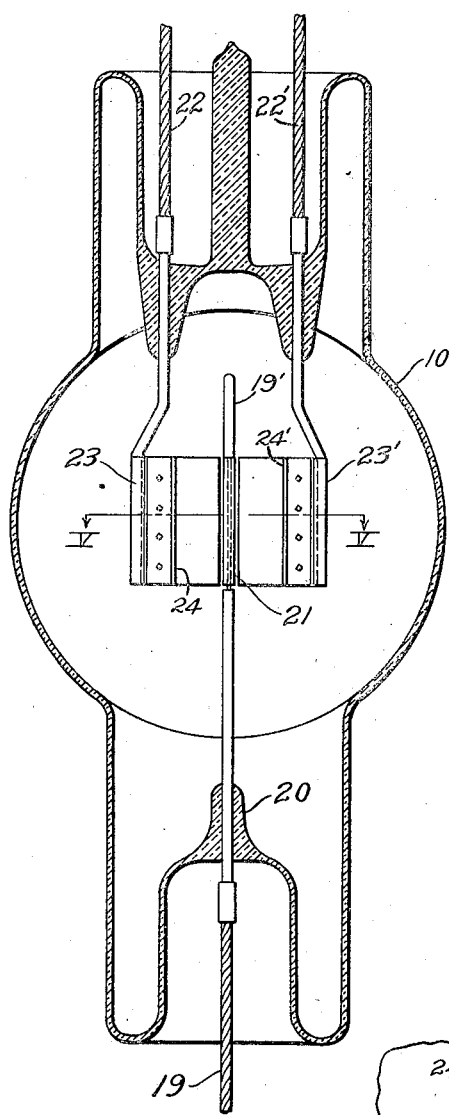
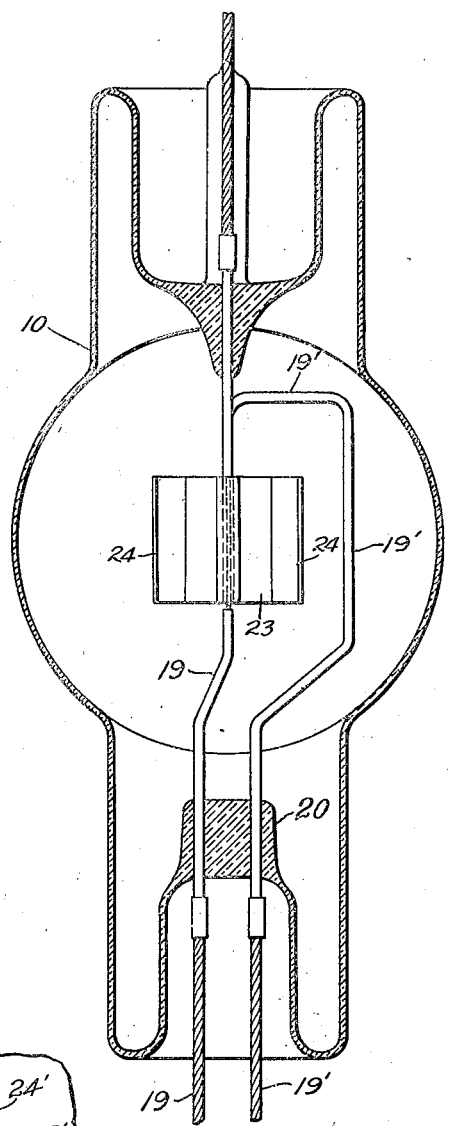
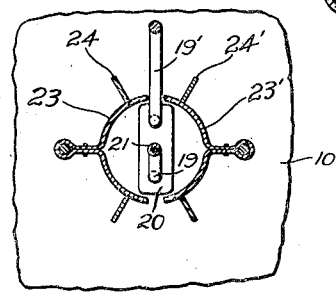
WITNESSES:
INVENTOR
George R. Kilgore
BY
ATTORNEY Dec. 15, 1936.  G. R. KILGORE  2,064,012
MAGNETO-STATIC OSCILLATOR
Filed July 1, 1932     7 Sheets-Sheet 3

WITNESSES:

INVENTOR
George R. Kilgore.
BY
ATTORNEY

Dec. 15, 1936.    G. R. KILGORE    2,064,012
MAGNETO-STATIC OSCILLATOR
Filed July 1, 1932    7 Sheets—Sheet 4

WITNESSES:

INVENTOR
George R. Kilgore.
BY
ATTORNEY

Dec. 15, 1936.                G. R. KILGORE                2,064,012
                          MAGNETO-STATIC OSCILLATOR
                           Filed July 1, 1932        7 Sheets—Sheet 5

WITNESSES:
C. J. Weller.
Roy W. Bailey

INVENTOR
George R. Kilgore.
BY
F. W. Lyle.
ATTORNEY

Dec. 15, 1936.  G. R. KILGORE  2,064,012
MAGNETO-STATIC OSCILLATOR
Filed July 1, 1932  7 Sheets-Sheet 6

WITNESSES:
C. J. Weller.
Roy W. Bailey

INVENTOR
George R. Kilgore.
BY F. W. Lyle
ATTORNEY

Patented Dec. 15, 1936

2,064,012

UNITED STATES PATENT OFFICE 2,064,012

MAGNETO-STATIC OSCILLATOR

George R. Kilgore, Wilkinsburg, Pa., assignor to Westinghouse Electric & Manufacturing Company, East Pittsburgh, Pa., a corporation of Pennsylvania Application July 1, 1932, Serial No. 620,395

9 Claims. (Cl. 250—36)

My invention relates to oscillators and it has particular relation to oscillators for the generation of ultra short waves.

An object of my invention is to provide an electronic oscillator of the magneto-static type of generating wave lengths of less than 100 centimeters, and particularly for generating wave lengths of less than 50 centimeters.

Another object of my invention is to provide a high frequency oscillator with a more efficient output than those of the prior art when generating waves below one meter.

Another object of my invention is to produce an oscillator in which the frequency of the oscillations are determined by the flying time of the electron from the cathode to the plate.

More specifically stated, it is an object of my invention to provide a magneto-static oscillator in which the magnetic means provides a magnetic field at an angle to the longitudinal direction of the filament and plates.

Other objects of my invention will become evident from the following detailed description taken in conjunction with the accompanying drawings, in which:

Fig. 3 is a sectional view with some parts in elevation of a preferred type of tube for use in the magneto-static oscillator of Figs. 1 and 2;

Fig. 4 is a sectional view of the tube of Fig. 3 with the section revolved 90°;

Fig. 5 is a cross section on lines V—V of Fig. 3, disclosing the preferred shape of the anodes;

Figure 8:
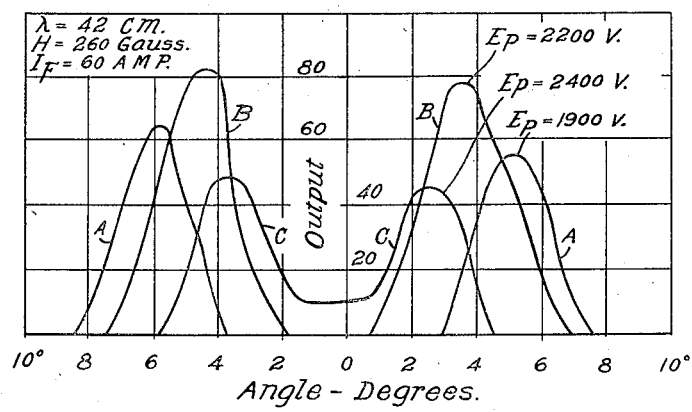
Figure 9:
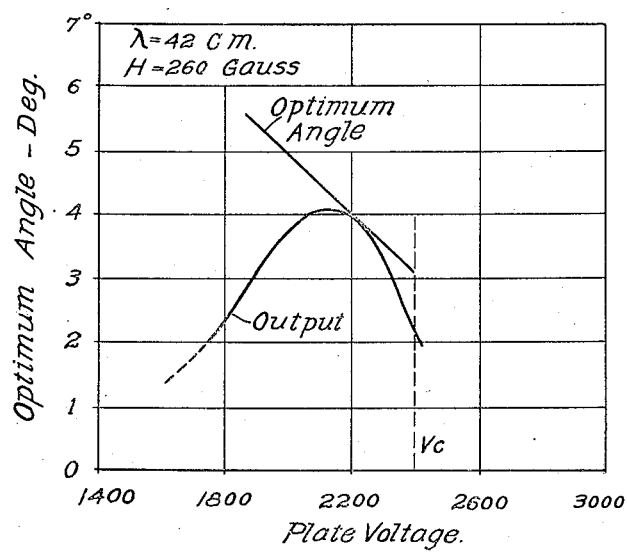
Figure 10:
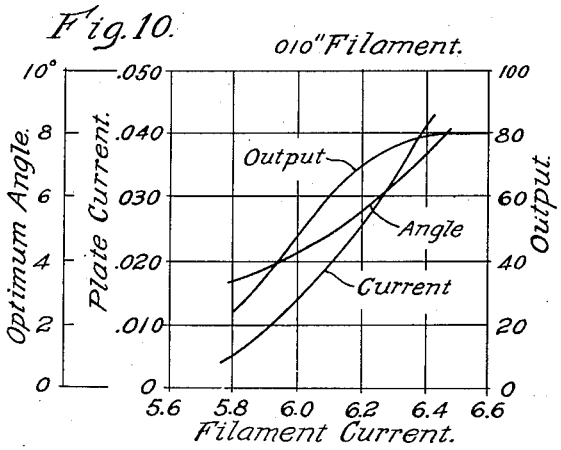
Figure 11:
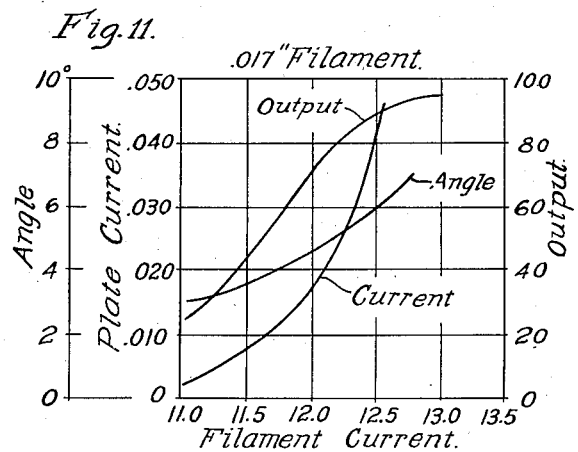
Figure 12:
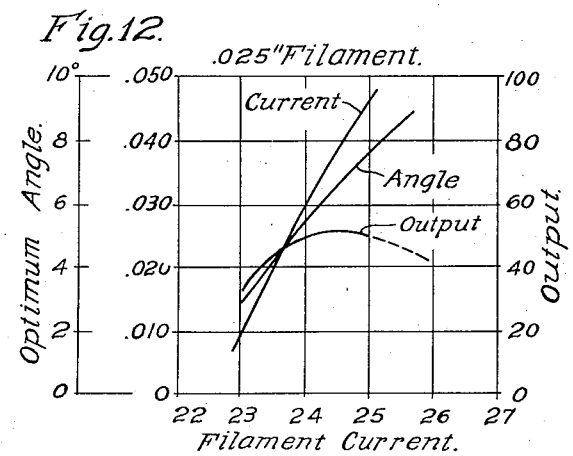
Figure 13:
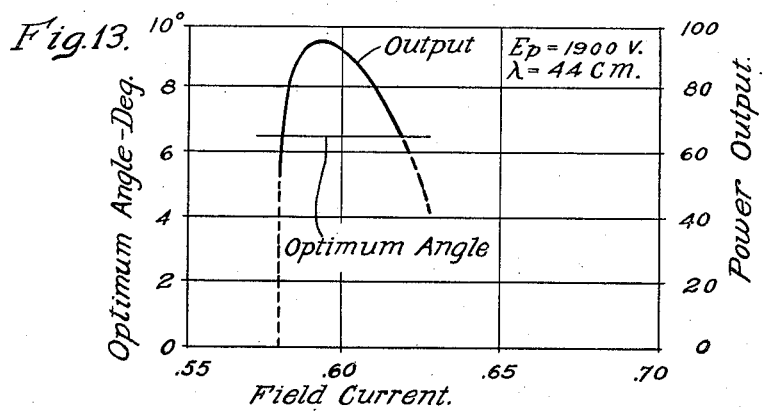
Figure 14:
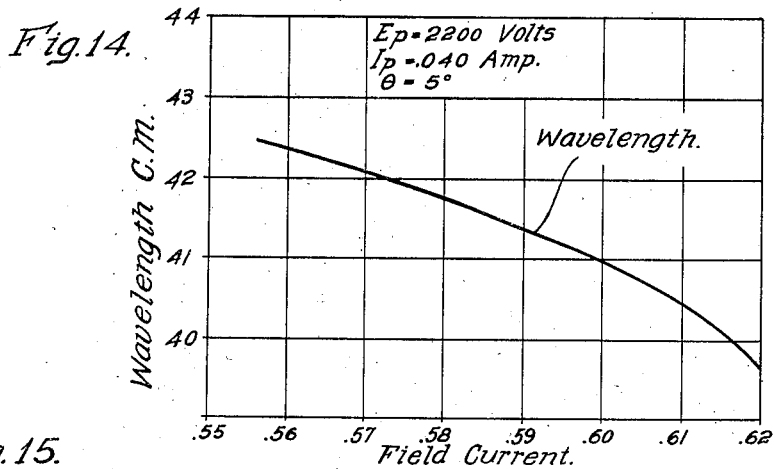
Figure 15:
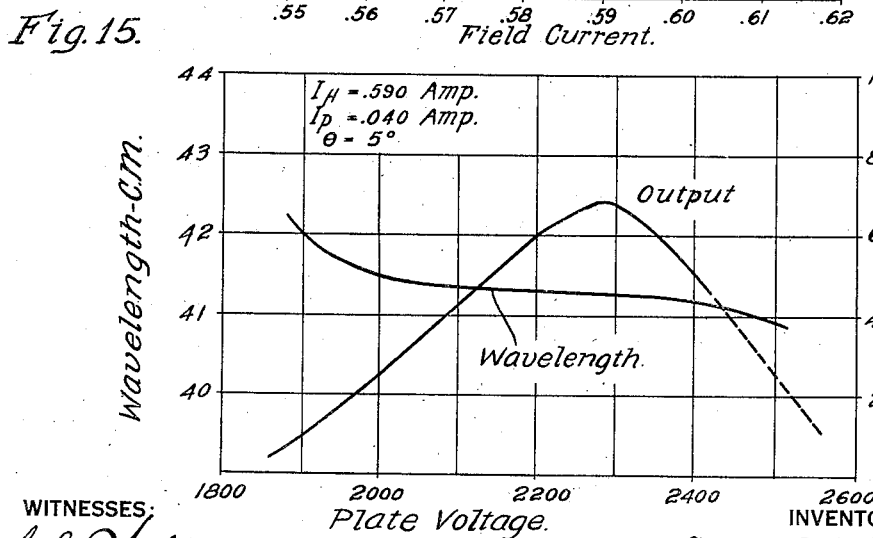
Figure 16:
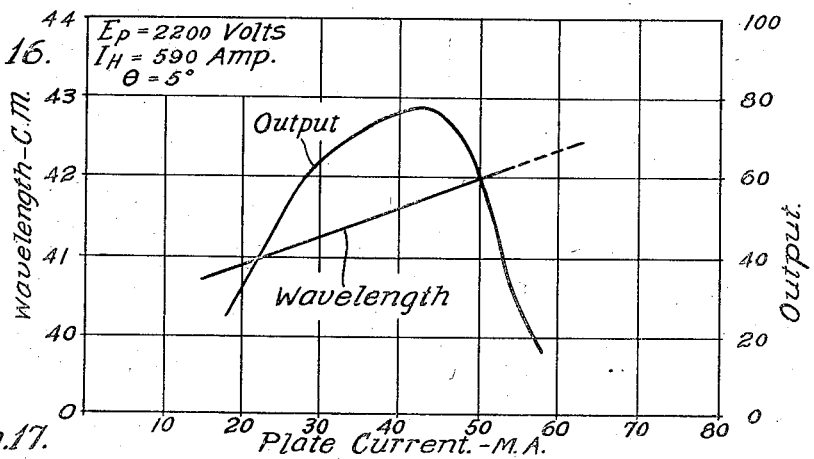
Figure 17:
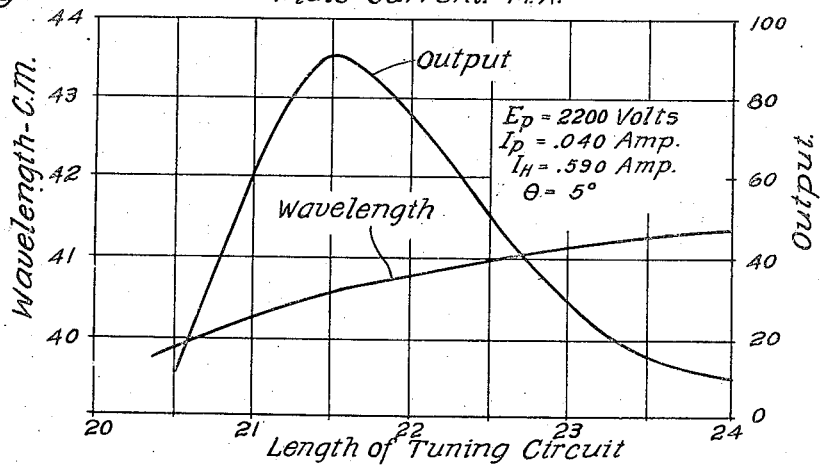
Figure 18:
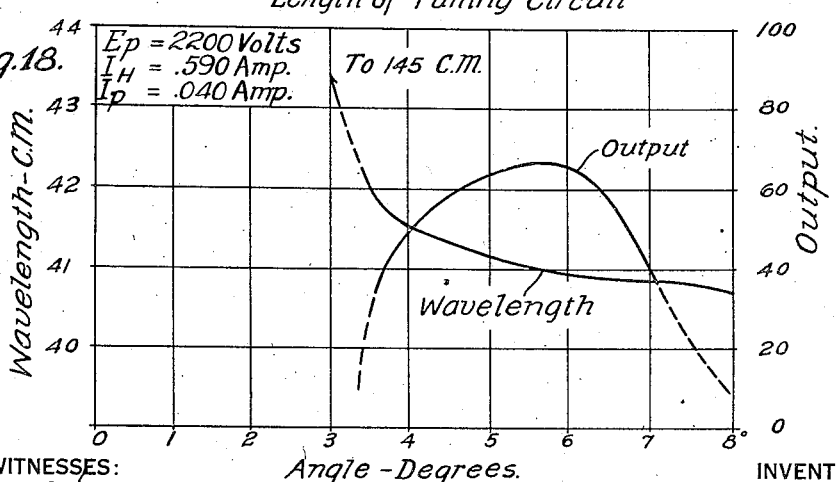

Fig. 8 discloses variation in output at various angles of the magnetic field with three different values of plate voltage;

Fig. 9 discloses the relation between power output and optimum angle with respect to plate voltage;

Figs. 10, 11 and 12 disclose the output optimum angle and current for various size filaments;

Fig. 13 is a curve disclosing the variation of output and the independence of the optimum angle with variation of field current;

Fig. 14 is a curve showing the relation of wave length to field current;

Fig. 15 is a curve showing the relation of wave length and output to variation in plate voltage;

Fig. 16 is a curve showing the relation of output and wave length to variation in plate current;

Fig. 17 is a curve showing the relation of output and wave length to variation in the length of the tuning circuit; and, Fig. 18 is a curve disclosing the relationship between output and wave length to variations in the angle of the magnetic field to the axis of the oscillator tube.

All above curves were taken and plotted for particular combinations of operating parameters, and show only the general lines governing the operation of magneto-static oscillations.

Heretofore it has been difficult to produce an oscillator for the generation of ultra-short waves below a meter wave length with a sufficient amount of power output to be practical. By my invention, however, I provide an oscillator that is practical for the generation of ultra short waves below 100 and even 50 centimeters in wave length. These oscillators have a magnetic means to provide a magnetic field in the space between the filament and the anode and I have discovered that, by adjusting this magnetic means so that direction of the magnetic field is at a slight angle to the longitudinal axis of the filament and anodes, the output of the oscillator is increased considerably. My experiments have disclosed that the optimum angle depends upon certain parameters of the circuit. In general, however, the optimum field angle usually occurred between three and six degrees, but in extreme cases was as high as 14 degrees.

Figure 1:
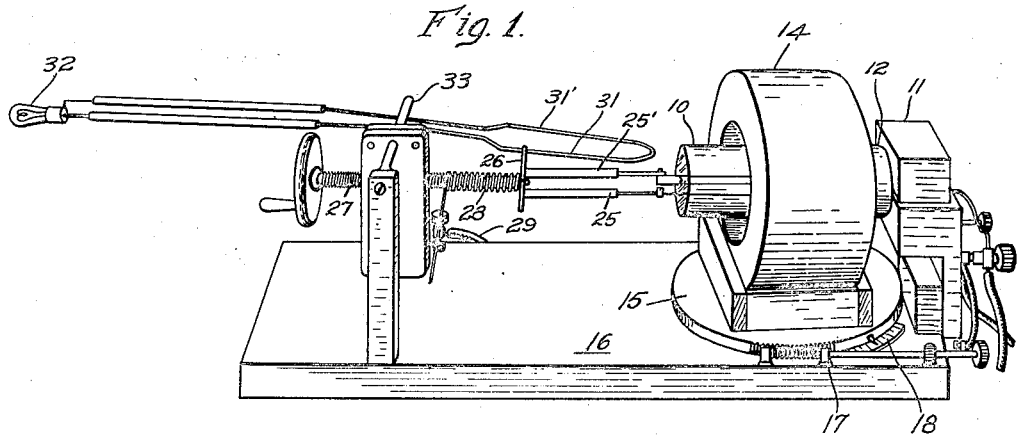
Figure 1 is a perspective view of a device embodying my invention.
Figure 2:
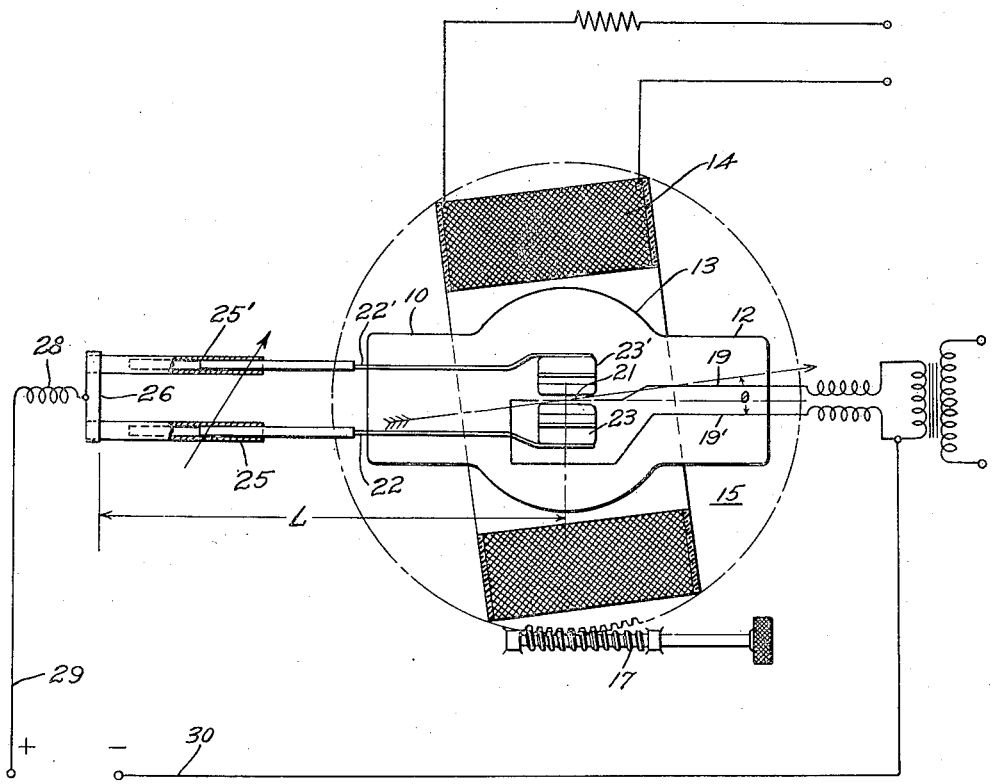
Fig. 2 is a diagrammatic view of the system of the magneto-static oscillator of Fig. 1.

In Fig. 1 is a view of a high-frequency oscillator incorporating my invention and in Fig. 2 is a diagram of the circuit connections therein. The tube or evacuated vessel 10 is mounted preferably with its longitudinal axis fixed by clamps 11 attached to one end 12. Surrounding the body 13 of the tube is a magnetic field coil 14 mounted upon a disc 15 pivoted to a support 16 and adjustably rotated through small angles by the worm gear device 17 disclosed in Fig. 1. A very accurately calibrated scale 18 indicates the angle of the axis of the coil with the longitudinal axis of the cathode and anode means inside the tube.

A suitable type of tube is disclosed in Figs. 3 and 4. The tube comprises an evacuated vessel 10 of any suitable shape. It is preferred to have the filament leads 19, 19' enter from one end of the tube through a press 20 and to have these leads spaced somewhat apart in this press. One of these leads 19 extends to the center line of the axis of the tube and somewhere near the center. The filament 21 is attached to this lead and extends along the axis of the tube to a point preferably beyond the center of the tube and is attached to the other lead 19' which extends at right angles a certain distance above the filament and then returns to the press spaced well away from the filament.

The anode leads 22, 22' preferably enter the tube at the opposite end from the filament leads and there are preferably two of these anode leads spaced apart in parallel relation and symmetrical with the axis of the filament and tube. There are preferably two anodes 23, 23' in the form of semi-cylinders spaced apart approximately 1/8". The semi-cylindrical anodes preferably have fins 24, 24' radially extending therefrom, as disclosed in Fig. 5. It will be noted that the anode leads, as well as the anodes themselves, are symmetrical with respect to the filament. Both anode leads are also equally spaced from the adjacent filament lead in the upper portion of the tube in Fig. 3.

On the exterior of the tube these parallel anode leads are enclosed in sliding tubes 25, 25' in order to govern the exterior length of the leads. As disclosed in Fig. 2, a heavy bridge 26 shorts the two tubes enclosing the leads. Any convenient manner of adjusting the length of these exterior leads can be used, such as the adjustable screw 27 disclosed in Fig. 1. This exterior adjustable arrangement forms a tuning system commonly referred to as Lecher wires and, while the value of the wave length of the oscillations is almost independent of the external circuit, I have found that, by proper tuning of the external circuit, the output could be increased many times. Maximum output was obtained when the length of these Lecher wires was approximately ½ wave length and another maxima could be found for the Lecher system length equal to a multiple of ½ wave length.

A choke coil 28 is attached to this shortening bridge and, in Fig. 1, this choke coil is formed very conveniently by winding a wire about the shank of the adjusting screw 27 for the Lecher wires. A high voltage is applied between this choke coil lead 29 to the anodes and one of the filament leads 30 as disclosed in Fig. 2.

Either direct or alternating current may be used for energizing the filament.

One form of output circuit is disclosed in Fig. 1 in which two wires, 31, 31' extend closely parallel with the Lecher wires enclosing the external leads of the anodes. These parallel wires may be used with various load circuits, such as the light bulb 32 disclosed in Fig. 1. In order to get a suitable output, however, the characteristic impedance of the load should be properly matched with the characteristic impedance of these wires and properly coupled to the primary system connected to the anodes. If the output circuit is not correctly adjusted, there are apt to be standing waves on the output wires. If it is impossible to get rid completely of standing waves, it is very desirable that the supporting clamp 33 should be attached to the wires at a node in the voltage wave.

To start oscillations, the magneto-field must be adjusted to a value near the "critical value", the general formula for which is $$H = \frac{6.72}{R}\sqrt{V}$$

Figure 6:
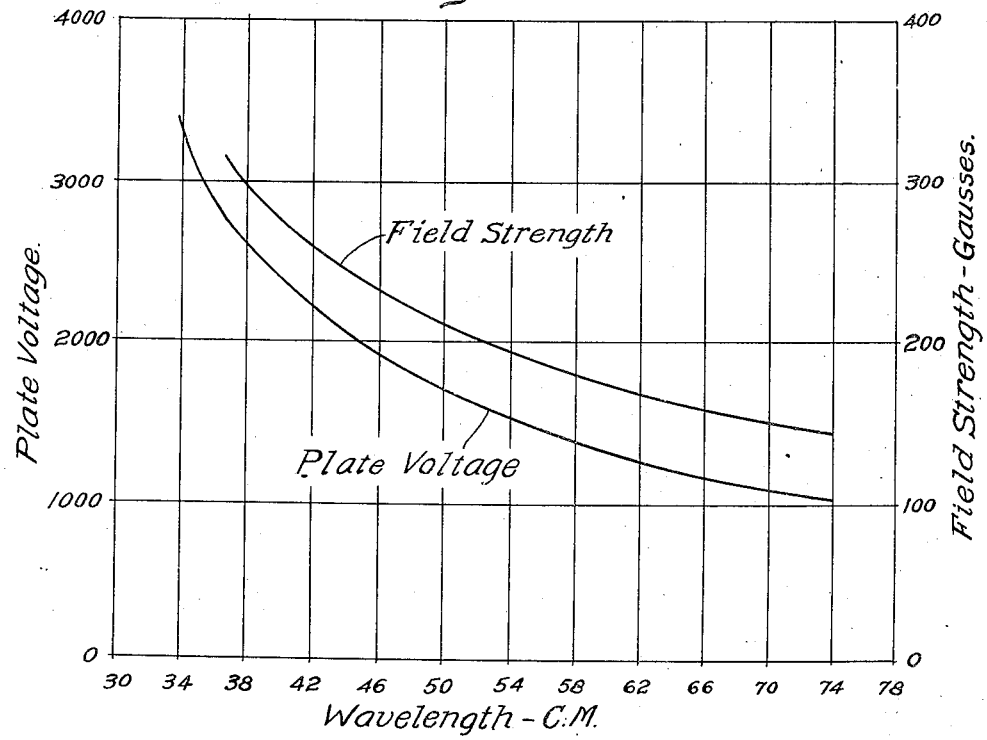
Fig. 6 is a curve disclosing a typical manner in which the plate voltage and field strength must be varied with wave length.

H is the magnetic field in gauss, R the anode radius in centimeters and V the anode potential in volts. For best output the field must be somewhat greater than this critical value. To obtain any desired frequency, the magnetic field and plate voltage must both be adjusted to certain values. The typical manner in which plate voltage and field strength must be varied with wavelength is shown in Fig. 6.

Figure 7:
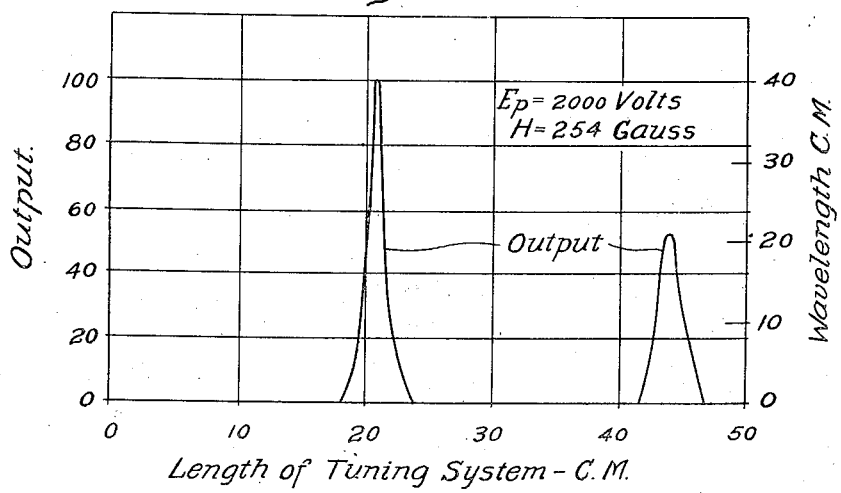
Fig. 7 is a curve disclosing the relationship between the length of the tuning system to output and wave length.

A typical output tuning curve is shown in Fig. 7.

Another important characteristic of this oscillator is that it must be operated at comparatively low plate current, and to obtain maximum output, plate current must be held within a rather narrow range. The filament temperature required to give the proper plate current is much lower than is conventional tubes, so that the filament has a very long life.

As previously mentioned, I discovered that, to obtain an appreciable output, the magnetic field of these magneto-static tubes should be inclined at a small angle to the tube axis. The results of experiments showing how output varies with the field angle is disclosed in the curves of Fig. 8. Curve B of this group is the most representative shape of curve. In this case, no oscillation exists until the field is inclined about one degree, then the amplitude increases to a maximum at 4 degrees and drops to zero again at 7 degrees. When the field is inclined on the other side of the zero axis, the same effect occurs, showing that the phenomenon is not merely due to some unsymmetrical condition of the tube. These curves are for a split-anode tube, but similar curves were also observed for a tube having a continuous cylindrical anode, although with much less output.

Usually no oscillation could be detected at zero angle, but sometimes at higher voltages, with the split-anode tube, there was evidence of oscillation, as seen in curve C, Fig. 8. However, when the wave length of these oscillations was measured, it was found that the wave length had jumped from 42 centimeters to about 145 centimeters. These comparatively long wave oscillations were no doubt ordinary oscillations where frequency is determined by the inductance and capacity of the circuit, rather than by the flying time of electrons. Apparently, there is a discontinuity in frequency at small angles, in fact, sometimes it was possible to change the wavelength from 145 cm. to 42 cm. by merely shifting the field angle by a few degrees. Furthermore, in some cases, there was evidence of the two frequencies existing together, but in these conditions the oscillations were very unstable.

The field angle at which maximum amplitude occurred usually was between 3 and 6 degrees, but in extreme cases was as high as 14 degrees. The chief factors which determine the optimum angle are plate voltage and plate current. The way in which optimum angle varies with plate voltage is illustrated in Figs. 8 and 9. Over the range studied, there is almost a linear relation between plate voltage and optimum angle, the angle decreasing with increasing voltage.

When the other parameters were fixed and filament current was increased, the field angle for obtaining maximum output also had to be increased. The relation between current and optimum angle is shown in Figs. 10, 11 and 12 for various sizes of filaments.

Although the optimum field angle varies considerably with plate voltage and plate current, it is apparently quite independent of the magnetic field strength within certain limits. This is disclosed in Fig. 13 where the field current is varied, while the other parameters are constant.

Since the magneto-static tube utilizes the electron oscillation principle, there must be a definite relation between frequency and the time of flight of electrons. By experiment, and calculation, it was found to lie between .6 and .78 of a period. The lower value corresponds to the condition of no space charge and the higher value to a space charge resulting in a ⅔ power potential distribution. Space charge always exists to some extent, so the flying time is always greater than .6 period.

Since frequency depends largely on flying time, any factor which effects flying time directly or indirectly will effect frequency. Most all of the factors connected with tube operation, such as plate voltage, plate current, field strength, field angle, etc., effect time of flight somewhat and so will also effect frequency.

It is evident that the factor which has the greatest effect on frequency is the magnetic field strength.

Frequency is also effected by the tuning of the circuit, but not nearly as much as in the conventional oscillator where frequency depends mainly on circuit constants.

I have experimentally determined that my output at 42 cm. was greater than any prior tubes with a wavelength at 65 cm. and that the efficiency of my tube is several times that of other tubes of the prior art at this longer wavelength of 65 cm.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A high-frequency oscillator comprising an evacuated vessel having an elongated cathode and anode means cooperating therewithin and means producing magnetic lines of force between said anode means and said cathode, means for maintaining the path of the lines of force of said last-mentioned means adjacent said cathode in acute angular relation of between three-fourths of 1 degree and 14 degrees with said elongated cathode and means connected to said cathode and anode means for producing oscillations.

2. A high-frequency oscillator comprising an evacuated vessel having a cathode axially alined therein and anode means cooperating therewith, magnetic means producing lines of force between said anode means and said cathode, and means maintaining said magnetic means in acute angular adjustment of between three-fourths of 1 degree and 14 degrees in respect to its flux and said cathode and means connected to said cathode and anode means for producing oscillations.

3. A high-frequency oscillator comprising an evacuated tube having a cathode axially aligned therein and anode means cooperating therewith and a coil surrounding said tube and producing a magnetic field between said anode means and said cathode, the axis of said coil being at an acute angle between three-fourths of one degree and 14 degrees with the axis of said tube and means connected to said cathode and anode means for producing oscillations.

4. A high-frequency oscillator comprising an evacuated tube having a cathode axially aligned therein and anode means cooperating therewith and a coil surrounding said tube and producing a magnetic field between said anode means and said cathode, the axis of said coil being at an acute angle between three-fourths of one degree and 14 degrees with the axis of said tube, means for maintaining the desired amount of said angle and means connected to said cathode and anode means for producing oscillations.

5. A high-frequency oscillator comprising an evacuated vessel having an elongated cathode therein and a plurality of anodes cooperating therewith, magnetic means and means maintaining said magnetic means in angular adjustment in respect to its flux and said cathode and tuning and oscillating means applied to said anodes for producing the desired oscillations.

6. A high-frequency oscillator comprising an evacuated vessel having a cathode and a plurality of anodes symmetrically aligned with said cathode, means producing a magnetic field between said cathode and anodes and means maintaining said magnetic means in angular adjustment in respect to its flux and said cathode and anodes and means connected to said cathode and anodes for producing oscillations.

7. A high-frequency oscillator comprising an evacuated vessel having a cathode and an even number of anodes, magnetic means producing a magnetic field between said cathode and anodes, means maintaining an angular adjustment between said field and said cathode and anode leads for said anodes exterior to the vessel being parallel to one another and adjustable in length and a bridge across said adjustable leads.

8. A high-frequency oscillator comprising a vacuum-tight vessel having a cathode axially aligned therein and anode means cooperating therewith, a coil surrounding said vessel and producing a magnetic field between said anode means and said cathode, the axis of said coil being at an angle between 1° and 10° with the axis of said tube and means connected to said cathode and anode means for producing oscillations.

9. A high-frequency oscillator comprising a vacuum-tight vessel having a cathode and anode means axially symmetrical with said cathode, a coil surrounding said vessel and producing a magnetic field between said anode means and said cathode, the axis of said coil being at an angle between 1° and 10° with the axis of said cathode.

GEORGE R. KILGORE.